July 28, 1936.
G. W. WATSON
Re. 20,052
COMMUNICATION SYSTEM
Orig. 1,741,077
Original Filed April 11, 1931
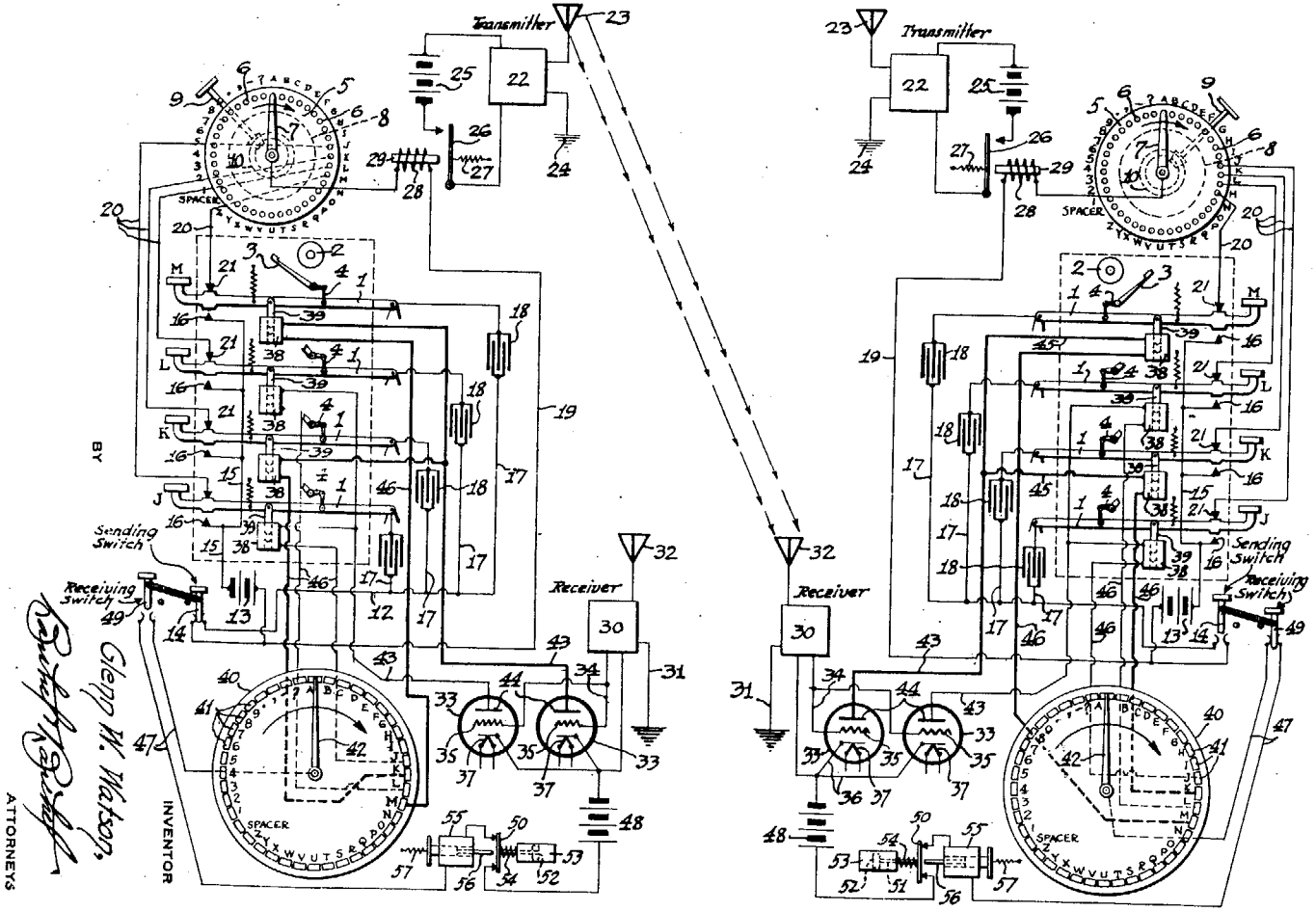
INVENTOR
BY
Glenn W. Watson,
ATTORNEYS

4

Reissued July 28, 1936

Re. 20,052

UNITED STATES PATENT OFFICE 20,052

COMMUNICATION SYSTEM

Glenn W. Watson, Binghamton, N. Y., assignor, by mesne assignments, to International Business Machines Corporation, New York, N. Y., a corporation of New York Original No. 1,927,077, dated September 19, 1933, Serial No. 529,436, April 11, 1931. Application for reissue April 17, 1935, Serial No. 16,849

20 Claims. (Cl. 178—4)

The present invention pertains to a novel communication system and resides in improvements and refinements of the system shown in my copending application, Serial No. 426,860, filed February 8, 1930, patent granted February 23, 1932, No. 1,847,030.

The invention embodies the use of synchronized contact disks at the radio transmitting and radio receiving stations for completing the transmitting and receiving circuits respectively. At the sending station, the impulse is not transmitted until contact of revolving arm is made at the particular contact of the contact disk corresponding to the actuated key or button for the character to be sent; and at the instant of contact, the impulse is sent out and caused to register the same character at the receiving station, due to the synchronism of the contact disks.

In the present invention the characters are transmitted by the depression of key bars. On depression of a bar, a condenser circuit is completed, and when the bar is released, the charged condenser holds its electrical charge until caused to discharge into the transmitting circuit when the revolving arm makes contact, as a result of which an impulse is transmitted. Thus, the transmitting apparatus comes into play on the return rather than on the depression of a bar. If the sending of an impulse depended only on the depression of the bar, the duration of impulses would be unequal in a manually operated transmitting machine, and this inequality would result in confused reception at the rapidly acting receiving mechanism.

The invention further embodies mercury vapor tubes functioning as relays in the receiving circuit. These tubes are ionized by the reception of an impulse received by radio. The ionization lags for an interval of about .001 second after the plate circuit has opened, and this lag would ordinarily result in the reception of characters other than that intended to be sent by a given impulse. In order to overcome this difficulty, several relay tubes are provided, and each is connected to a group of the devices which cause the imprinting of the received characters. Only one tube may be ionized at a time by a single impulse, dependent on which segment of the receiving contact disk is engaged by the revolving arm. Each tube is operative on only a limited number of alternate character recording devices, so that the lag in a tube in circuit with a given segment will not pass current through the next adjacent segment.

Another object of the invention is to avoid the rapid recording of numerous successive characters or injury to the receiving apparatus, when the relay tubes are ionized for a substantial interval by a crash of static. Due to the speed of the circuit-making contact means in the receiving apparatus, the recording members would theoretically be actuated about two hundred times in one-fifth of a second. A static charge of this duration would therefore tend to cause the recording of two hundred characters, but more likely the receiving apparatus would be injured. To avoid difficulty in this respect, the receiving circuit has incorporated therein an automatic magnetic cut-out with a retarding device operative on the closing of the cut-out. The retarding device is so regulated as to permit the closing of the circuit and the recording of characters at an approximate rate of five per second, which is the maximum speed at which a speedy operator can operate the sending apparatus.

Thus, a prolonged charge of static will cause the recording of not more than five characters per second. This rate is not detrimental to the instrument, and the erroneous characters introduced in the message would in most cases be readily detected.

A further object of the invention is to provide an apparatus which may be used interchangeably for sending or receiving. The selection for either use is accomplished by means of a switch which opens either the tube circuit or the condenser circuit and closes the other circuit. Inasmuch as the condenser circuit is essential for transmission and the tube circuit is essential for reception, the opening of either of these circuits renders the apparatus inoperative for the function dependent on the open circuit.

The invention is fully disclosed by way of example in the following description and in the accompanying drawing which shows a diagrammatic view of the apparatus. Inasmuch as the receiving apparatus and sending apparatus are alike, a detailed description of only one of them will suffice.

For the purpose of description, the drawing shows the apparatus adjusted for transmitting from left to right.

The transmitting apparatus, (and also the receiving apparatus) includes a conventional or modified typewriter having a series of lettered and numbered pivoted key bars 1. Over the bars is mounted a roll 2 held in a slidable carriage (not shown) in the usual manner so that it is moved one space on depression of any key bar. Each key bar has associated therewith a type bar 3 adapted to strike against the roll 2 on depression of the corresponding key bar. This action is effected through a suitable linkage 4 between each key bar and the corresponding type bar.

A contact disk 5 carries a series of spaced contacts 6 corresponding respectively to the various characters on the type bars 1. The contacts are engaged in rather rapid succession by a rotary contact arm 7 driven by a motor 8, spring or electric, which is in synchronism with the similar device at the other end of the transmission circuit. Obviously, the disk rather than the arm may rotate if more convenient. The disks may be manually set in register with each other, with respect to the corresponding arms 7, by shafts 9 geared as at 10 to the respective disks.

Each of the key bars 1 is comprised in a branch condenser circuit embodying a common conductor 12 in which is comprised a condenser charging battery 13 and a sending switch 14 which is closed at the sending end. The corresponding switch is open at the receiving end, as will be more fully described hereinafter. A line 15 is extended from one side of the battery 13 and is branched separately to a series of contacts 16 disposed respectively beneath the key bars 1 and normally spaced from the latter when the bars are in their normal or raised position.

The common conductor 12 extending from the other side of the battery 13, is branched at 17 to each of the bars 1, and in each of these branches is inserted a condenser 18. Thus, when any of the bars 1 is depressed, the corresponding branch condenser circuit will be completed at the contact 16 engaged by the depressed bar, and the corresponding condenser 18 will be charged from the battery 13.

The sending circuit embodies a conductor 19 joining the arm 7 to the side of the switch 14 free from the condensers 18. The other side of this circuit is branched by conductors 20 extending separately from the contacts 6 on the disk 5 to fixed contacts 21 positioned over the key bars 1. The latter contacts are engaged by the corresponding bars 1 when the latter are in raised or released position and at such time close a sending circuit consisting of the conductor 19, switch 14, one condenser 18, and a corresponding bar 1, contact 21, branch 20, contact 6, and finally the arm 7.

The radio transmitter 22 has one of its output terminals connected to an antenna 23 and its other output terminal 24 grounded in the usual manner. The input terminals are connected to opposite sides of a battery 25, but in the battery circuit is comprised a switch 26 normally held open by a spring 27. Adjacent the switch 26, the conductor 19 includes a solenoid 28 surrounding a core 29 which attracts the member 26 to closed position when current is flowing in the conductor 19.

In the operation of the device as thus far described, it will be seen that the depression of a key bar 1 first breaks the corresponding branch circuit at the contact 21 and closes one of the branch condenser circuits to charge the corresponding condenser 18.

On return of the bar 1 into engagement with its contact 21, the sending circuit will be closed when the arm 7 reaches the corresponding contact 6 on the disk 5, in the manner described in the aforementioned copending application. The closing of the sending circuit in this manner operates the relay 26—29 to connect the battery 25 to the transmitter 22 and thus send an impulse from the antenna 23.

The receiving circuit of each apparatus includes a receiver 30 having one of its input terminals grounded at 31 and its other input terminal connected to an antenna 32 adapted to receive the impulse sent out from the antenna 23 in the usual manner. Also embodied in the receiving circuit is a series of mercury vapor tubes 33, here represented by two such tubes. One of the output terminals of the receiver 30 is connected by branch conductors 34 to the grids 35 of the tubes, and the other output terminal is connected by branch conductors 36 to the filaments 37 of the tubes.

Beneath each of the key bars 1 is a solenoid 38 adapted to operate on a plunger 39 in the form of a finger depending from the bar, so that when a given solenoid is energized by the means presently to be described, the corresponding key bar will be depressed to actuate the corresponding type lever 3. The receiving circuit is governed by a disk 40 carrying spaced contacts 41 corresponding in number and position to the contacts 6 on the disk 5. A contact arm 42 rides over the contacts 40 and is driven by a mechanism in synchronism with the motors 8, preferably by being geared to the corresponding arm 7, so that the arms 7 and 42 are in engagement with similarly identified contacts at any instant.

Conductors 43 extend from the plates 44 of the tubes 33 and are branched at 45 to like terminals of the solenoids 38. In other words, the solenoids are divided into as many groups as there are tubes 33, and each group is connected to a different tube. The tubes 33 are connected successively to the solenoids 38 in the order in which the latter are represented on the disks 5 and 40. The remaining terminals of the solenoids 38 are connected by conductors 46 to the corresponding contacts 41.

The receiving circuit is completed by a conductor 47 connected to the branches 46 and the arm 42 and containing a battery 48, the closed receiving switch 49 and a cut-out device which will presently be described.

On reception of an impulse at the antenna 32, one of the tubes 33 is ionized and functions as a relay, dependent on which tube has a circuit closed by the arm 42, enabling the transmission of electrical energy from the filament to the plate thereof. The receiving circuit, including the battery 48, arm 42 and any contact 41, is completed instantaneously and causes energization of the particular solenoid 38 corresponding to the contact 41 which happens to be engaged by the arm 42. The character corresponding to this contact 41 is printed on the roll 2 at the receiving station. The characters printed at the receiving station will appear in the same order in which they are sent inasmuch as the arms 7 and 42 are in synchronism and always in like relation to the contacts engaged thereby, and since the impulse is transmitted only when the arm 7 at the sending station engages the contact 6, corresponding to the key which has been depressed.

The tubes 33 are likely to remain ionized for a fraction of a second after the plate circuit has been broken between segments 41, and if all the solenoids 38 were dependent on one tube, there would be danger of printing two or more successive characters on one impulse. This danger is overcome by the fact that solenoids corresponding to the successive characters are connected to different tubes, so that the lag in any tube will not be effective on the contact adjacent that corresponding to the ionizing impulse.

4

It will be noticed that the receiving contacts 41 are of greater length circumferentially than the sending contacts 6. In fact, the latter are made as short as possible in order that the transmitted impulse may be instantaneous. The longer receiving contacts 41, however, hold the receiving circuit closed for an interval sufficient to enable energization of the solenoids 38 and operation of the type bars 3 as well as to allow for slight inaccuracies in the synchronism of the transmitting and receiving arms 7 and 42 respectively. The comparatively short space between the adjacent segments 42 is sufficient to break the receiving circuit and de-ionize the tubes, despite any lag in the tubes, since a given tube is not in circuit with two adjacent segments 42, as stated above.

The cut-out device previously mentioned includes a switch blade 50 adapted to interrupt current in the line 47. This blade carries a stem 51 and piston 52 slidable in a vented cylinder 53 to produce a dashpot effect. A spring 54 surrounding the stem normally holds the member 50 in closed position. The line 47 also contains a solenoid 55 containing a plunger 56 adapted to move the arm 50 to circuit-opening position immediately the circuit is energized. The plunger is normally withdrawn from the member 50 by a spring 57.

Thus, the receiving circuit is closed for an instant on reception of each impulse, since the energization also effects the opening of the circuit through the members 55, 56, and 50. The circuit does not open instantly, however, due to the time required for the solenoid 55 to become energized and for the stem 56 to reach the switch blade 50. This interval corresponds to that necessary for energizing a solenoid 38, so that the circuit is not opened prematurely before actuation of the key bar 1.

This arrangement is necessary in view of static crashes which would otherwise cause the recording of numerous successive characters. The arm 42 makes about five revolutions per second and therefore covers about two hundred receiving segments per second, so that a crash of static would tend to register characters at the rate of two hundred per second or injure the printing mechanism. To avoid this difficulty, the return of the member 50 to closed position is retarded by the dashpot, but the delay is shorter than the interval between the striking of two key bars 1 by a speedy operator, or about one-fifth of a second, so that static causes the imprinting of erroneous characters at the rate of five per second, without injury to the mechanism.

In order to bring the sending arm 7 into register with the receiving arm 42, with respect to the characters on the disks 5 and 40, the sending operator first transmits a predetermined signal, such as a repetition of the character "A" or the spacer, for a given interval. This is a signal to the receiving operator that a message is about to be sent, whereupon he sets the arm 42 on a given character on the disk 40, by pre-arranged agreement, corresponding to the position of the arm 7 on the transmitting disk 5.

This operation is performed by turning the shaft 9 at the receiving apparatus, it being understood that this shaft is permanently geared to the arm 42. The sending operator allows the receiving operator sufficient time to make this adjustment, and then sends the message.

It will be evident that the switch 14, being open at the receiving end, renders the condensers 18 inoperative and ineffective; and in like manner, the receiving switch 49 being open at the sending end, renders the tube circuits inoperative. Thus, the apparatus installed at any station may be used interchangeably for sending or receiving, on proper adjustment of the switches 14 and 49.

Some of the uses for which the invention is suitable are the following: Sending messages in a building such as a bank or between buildings, sending weather reports or other messages to aeroplanes, balloons, submarines, war vessels, police cruising cars, sheriff officers, camps in war time, receiving news in a home, office communication within one building or between buildings, international communication, transoceanic communication, etc.

Although a specific embodiment of the invention has been illustrated and described, it will be apparent that various alterations in the details of construction may be made without departing from the spirit of the invention as indicated by the appended claims.

What is claimed is:

1. In a printing telegraph system, means for transmitting character impulses including a series of operable printing members to select the character impulses, selection control means associated with each of said printing members to be conditioned upon operation of the members and maintain the said character selection after operation of said members, circuit-control means for initiating the character impulses at differential times to represent the different characters and in accordance with the selection as controlled by the said selection control means, each character represented by a single differentially timed impulse, means for receiving the impulses transmitted including circuit-control means, the operation of which being in timed relation with that of the first mentioned control means, and recording means controlled by the transmitted impulses in accordance with the selection maintained by the said selection control means, said recording means being governed by the last mentioned circuit control means.

2. In a printing telegraph system, means for transmitting character impulses including a series of printing members to select the character impulses, electro-static devices to be conditioned by the operation of said printing members to store the selected character impulses, one of said devices associated with each of said printing members, circuit-control means for initiating the character impulses at differential times to represent the different characters and in accordance with the selection as controlled by the said conditioned devices, each single, differentially timed, impulse initiated and transmitted representing a character, means for receiving the transmitted impulses including circuit-control means, the operation of which being in timed relation with that of the first mentioned control means, and recording means controlled by the transmitted impulses in accordance with the selection maintained by the said conditioned devices, said recording means being governed by the last mentioned circuit-control means.

3. In a communication apparatus, a sending machine having alphabetical character key bars, a condenser for each key bar, each condenser adapted to be conditioned upon the operation of the corresponding key bar to represent the selection of the corresponding character, a transmission circuit, and means to control the energization of the transmission circuit by a single impulse initiated by the conditioned condenser representing the selected character.

4. In a communication apparatus, a sending machine having alphabetical character key bars, means associated with each key bar to be conditioned upon the operation of the corresponding key bar to represent the selection of the corresponding character, a transmission circuit, and individual means associated with each key bar which upon operation of the corresponding key bar is adapted to be connected to the transmission circuit to energize the said circuit by virtue of the said conditioned means.

5. In a communication system, printing units having character key bars, means individual for each key bar and adapted to be conditioned upon operation of the selected key bar to maintain the selection of the corresponding character after operation of the key bar, a transmission circuit adapted for connection to said individual means, a receiving circuit sensitive to said transmission circuit, printing members associated with said receiving circuit, electrical devices in said receiving circuit for selectively operating said printing members, and electronic means in said receiving circuit for operating said electrical devices.

6. In a communication system, character impulse transmitting and receiving means, a printer unit comprising operable instrumentalities, an individual circuit adapted to be controlled by each of said instrumentalities, means individual to each instrumentality embodied in the corresponding circuit and adapted to be conditioned upon the operation of an instrumentality to represent the selection of the corresponding character, circuit control means, additional individual means associated with the said instrumentalities to connect the said conditioned means to the circuit-control means, means included in the circuit-control means to render the conditioned means effective to control the transmitting means at instants of time predetermined individually with respect to each character thereby initiating differentially timed impulses representing the characters, and printer means associated with said receiving means for receiving the differentially timed character impulses at an instant equally predetermined as in the transmitting means.

7. In a communication apparatus, a sending machine having alphabetical key bars, a condenser for each bar adapted to be charged by depression of the corresponding bar, contact members corresponding to said bars and connected respectively to said condensers and adapted to receive current from said condensers respectively on the return movement of a depressed bar, and a transmission circuit adapted to be energized on delivery of current to said contacts by said condensers.

8. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated therewith, electrical devices in said receiving circuit for selectively operating said printing members, and a plurality of relay devices in said receiving circuit, said electrical devices being grouped and each group connected to a different relay device.

9. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated therewith, electrical solenoids in said receiving circuit for selectively operating said printing members, and a plurality of relay devices in said receiving circuit, said electrical solenoids being grouped and each group connected to a different relay device.

10. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated therewith, electrical devices in said receiving circuit for selectively operating said printing members; and an automatic cut-out in said receiving circuit and operable on completion of said circuit.

11. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated therewith, electrical devices in said receiving circuit for selectively operating said printing members, an automatic cut-out in said receiving circuit and operable on completion of said circuit, and retarded means for returning said cut-out to closed position.

12. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated therewith, electrical devices in said receiving circuit for selectively operating said printing members, a plurality of relay devices in said receiving circuit, said electrical devices being grouped and each group connected to a different relay device, and an automatic cut-out in said receiving circuit and operable on completion of said circuit.

13. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated therewith, electrical devices in said receiving circuit for selectively operating said printing members, a plurality of relay devices in said receiving circuit, said electrical devices being grouped and each group connected to a different relay device, an automatic cut-out in said receiving circuit and operable on completion of said circuit, and retarded means for returning said cut-out to closed position.

14. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated there-

4

Search Room with, electrical devices in said receiving circuit for selectively operating said printing members, an automatic cut-out in said receiving circuit and operable on completion of said circuit, said cut-out comprising a switch arm in said circuit, a solenoid-operated plunger in said circuit adapted to open said arm on closing of a circuit therethrough, and a retarded return device for returning said arm to closed position.

15. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated with said key bars, electrical devices in said receiving circuit for selectively operating said key bars and printing members, and a plurality of relay devices in said receiving circuit, said electrical devices being grouped and each group connected to a different relay device.

16. In a communication apparatus, a sending machine having key bars, a condenser adapted to be charged by the depression of each bar, a transmission circuit adapted for connection to said condenser on the return movement of a depressed bar, a receiving circuit sensitive to said transmission circuit, printing members associated with said key bars, electrical devices in said receiving circuit for selectively operating said key bars and printing members, and a selecting switch for rendering either said receiving circuit or said condenser inoperative and rendering the other operative.

17. In a communication apparatus, a sending machine having key bars, a condenser circuit embodying said bars and a contact beneath each bar, a condenser in said circuit, said bar being normally spaced from the corresponding contact, a transmission circuit embodying said bars, and a contact above each bar and normally engaged thereby, whereby depression of a bar closes the condenser circuit and the return movement of said bar connects said condenser to said transmission circuit.

18. In a communication apparatus, a sending machine having key bars, a condenser circuit embodying said bars and a contact beneath each bar, a condenser in said circuit, said bar being normally spaced from the corresponding contact, a transmission circuit embodying said bars, a contact above each bar and normally engaged thereby, whereby depression of a bar closes the condenser circuit and the return movement of said bar connects said condenser to said transmission circuit, a receiving circuit, printing members associated with said key bars, and electrical devices in said receiving circuit for selectively operating said key bars and printing members.

19. In a communication apparatus, a printing machine having key bars, a condenser circuit embodying said bars and a contact beneath each bar, a condenser in said circuit, said bar being normally spaced from the corresponding contact, a transmission circuit embodying said bars, a contact above each bar and normally engaged thereby, whereby depression of a bar closes the condenser circuit and the return movement of said bar connects said condenser to said transmission circuit, a receiving circuit, printing members associated with said key bars, electrical devices in said receiving circuit for selectively operating said key bars and printing members, and a selecting switch for permanently rendering either said receiving circuit or said condenser circuit inoperative and rendering the other operative.

20. In a telegraph receiving system, elements serially arranged to receive the signals at a definite rapid rate at assigned time intervals, relay means for actuating said elements, and means for suspending the action of said relay means for a period substantially equal to one of said time intervals.

GLENN W. WATSON.